United States Patent
Mattox, Jr. et al.

(10) Patent No.: US 10,791,212 B1
(45) Date of Patent: Sep. 29, 2020

(54) ELECTRONIC CONCIERGE FOR AUTOMATING EVENT PLANNING AND APPLICATION CURATION

(71) Applicant: Microsoft Technology Licensing, LLC, Redmond, WA (US)

(72) Inventors: Gregory Thomas Mattox, Jr., Bellevue, WA (US); Raju Jain, Kirkland, WA (US); Jeffrey Jay Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/452,283

(22) Filed: Jun. 25, 2019

(51) Int. Cl.
*H04M 1/00* (2006.01)
*H04M 1/725* (2006.01)
*G06F 16/9537* (2019.01)

(52) U.S. Cl.
CPC .... *H04M 1/72566* (2013.01); *G06F 16/9537* (2019.01); *H04M 1/72522* (2013.01)

(58) Field of Classification Search
CPC .......... H04M 1/72566; H04M 1/72522; G06F 16/9537
See application file for complete search history.

(56) References Cited

U.S. PATENT DOCUMENTS

| | | | |
|---|---|---|---|
| 9,858,538 B1* | 1/2018 | Johansson | G06Q 10/02 |
| 2010/0057500 A1* | 3/2010 | Lim | G06Q 20/102 705/4 |
| 2011/0078612 A1* | 3/2011 | Matsuzawa | G06F 15/0225 715/772 |
| 2013/0173390 A1* | 7/2013 | Polo | G06Q 30/0261 705/14.58 |
| 2013/0196615 A1* | 8/2013 | Zalmanovitch | H04M 15/765 455/405 |
| 2014/0372898 A1* | 12/2014 | Ayres | G06Q 10/1093 715/744 |
| 2017/0344726 A1* | 11/2017 | Duffy | G06Q 50/22 |
| 2017/0351872 A1* | 12/2017 | Wu | G06F 3/0481 |
| 2018/0060979 A1 | 3/2018 | Mcnairn et al. | |
| 2018/0173861 A1* | 6/2018 | Guidotti | G06F 21/45 |
| 2019/0303807 A1* | 10/2019 | Gueye | G06Q 10/02 |

FOREIGN PATENT DOCUMENTS

EP  2605206 A1  6/2013

OTHER PUBLICATIONS

"International Search Report and Written Opinion Issued in PCT Application No. PCT/US2020/033668", dated Jun. 29, 2020, 11 Pages.

\* cited by examiner

*Primary Examiner* — Khai M Nguyen

(57) ABSTRACT

In non-limiting examples of the present disclosure, systems, methods and devices for assisting with event execution are provided. Data from a productivity application associated with a user may be analyzed. A significant life event associated with the user may be identified based on the analysis. A plurality of sources that each have at least one recommendation for executing a type of event corresponding to the significant event may be identified. An itinerary template for the significant life event may be generated from a plurality of the recommendations. The itinerary template may be surfaced. Additional examples of the present disclosure relate to identifying relevant applications for download to a user's device managed by an administrator device.

20 Claims, 12 Drawing Sheets

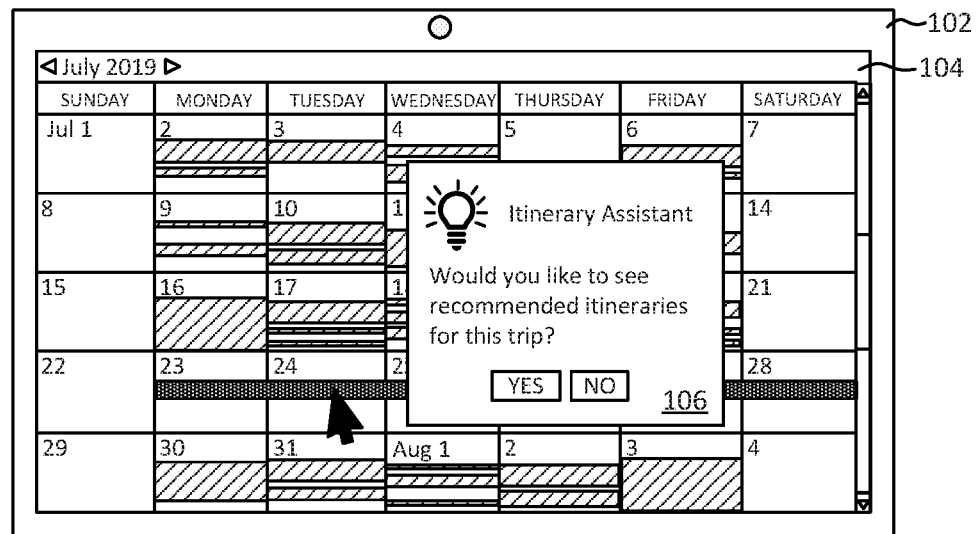
FIG. 1
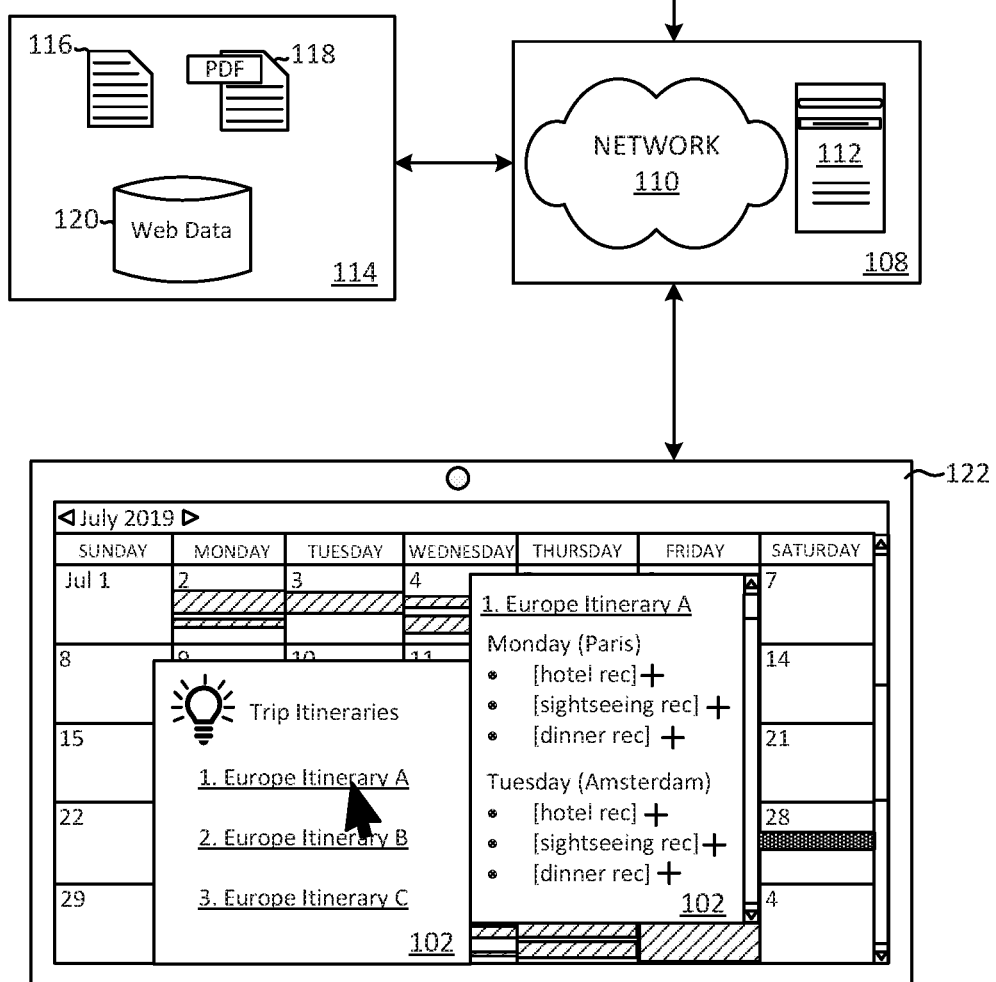

ELECTRONIC CONCIERGE FOR AUTOMATING EVENT PLANNING AND APPLICATION CURATION

BACKGROUND

Users now utilize computing devices and a variety of applications (electronic calendar applications, task completion applications, etc.) to assist in planning and managing important events in their lives (e.g., travel, vacations, parties, etc.). A great deal of time is often spent by these users performing research on various devices to determine which elements are necessary to execute a successful event and/or series of events. Users may not have the requisite time to identify relevant resources for planning such events and/or they man not know how to identify those resources in the most efficient manner Adult family members may also lack the time and/or knowhow to sufficiently identify and manage applications that are appropriate and useful for child members of the family.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with event planning and itinerary creation. An electronic concierge application and/or service associated with a user account may be provided with access to data associated with one or more productivity applications linked to the user account. The electronic concierge application and/or service may identify important "significant life events" from data associated with the one or more productivity applications. Upon identifying a significant life event, the electronic concierge application and/or service may identify resources that contain relevant elements that are useful to the planning of and/or generation of an itinerary for executing the event. The relevant elements from the resources may be utilized to generate one or more template itineraries for the event. The template itineraries may be interacted with to dive deeper into the recommended elements and/or assist with completing tasks associated with those recommended elements (e.g., add elements from an itinerary to an electronic calendar application, add elements from an itinerary to a task completion application).

Additional examples of the present disclosure describe systems, methods and devices for assisting with relevant application identification. In examples, parents may utilize an administrator and/or parent account associated with multiple devices to manage operations performed on secondary, child, devices. An electronic concierge service associated with those devices may identify applications that are popular, trending, and/or relevant to the child user based on various characteristics of that user. In some examples, a social resource graph may be utilized to identify applications that are most relevant to the user. Characteristics that maybe used to match a user to relevant applications may include an age of the user and/or an educational grade of enrollment of the user. Upon identifying one or more relevant applications, the electronic concierge application and/or service may surface a recommendation on the parent device to have the one or more applications downloaded on the child device.

BRIEF DESCRIPTION OF THE DRAWINGS

Non-limiting and non-exhaustive examples are described with reference to the following figures:

FIG. 1 is a schematic diagram illustrating an example distributed computing environment for identifying a significant life event from a productivity application and surfacing recommended itineraries for that event.

DETAILED DESCRIPTION

Figure 2:
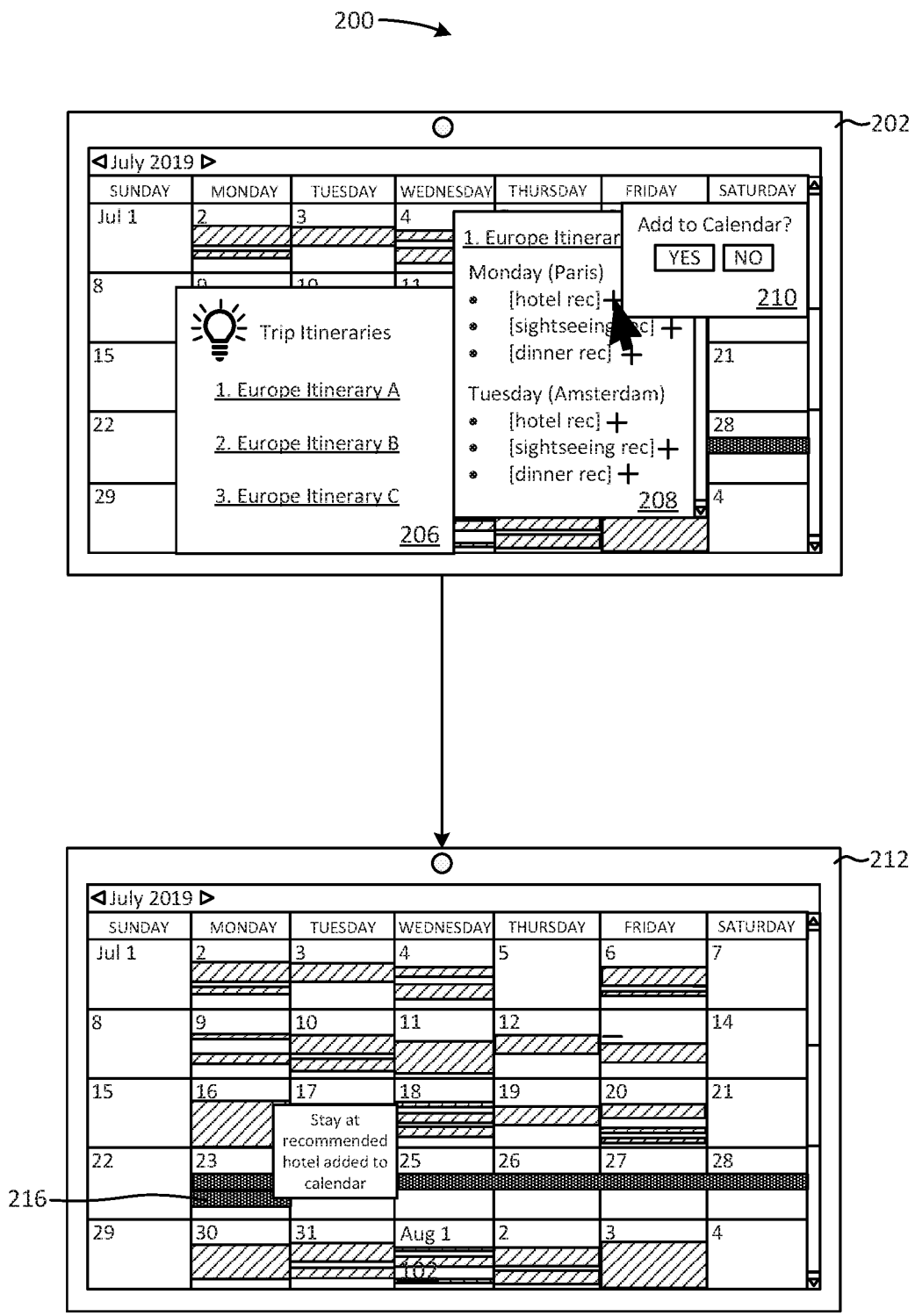
FIG. 2 illustrates a computing environment for interaction with a surfaced itinerary and corresponding addition of a recommendation element from the itinerary to an electronic calendar application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for assisting users with event itinerary planning. An electronic concierge application and/ or service may be granted access to data from one or more productivity applications (e.g., email applications, electronic calendar applications, notes applications, word processing applications, instant messaging applications, spreadsheet applications, presentation applications) associated with a user account. The electronic concierge application and/or service may apply one or more natural language processing and/or machine learning models to resources and metadata associated with one or more of those applications. In other examples, the electronic concierge application and/or service may apply keyword and/or phrase query processing to application resources and metadata. One or more of those models and/or queries may be trained to identify significant life events. As used herein, a significant life event comprises one or more of: a travel event, a vacation event, and a party event. For example, the electronic concierge application and/or service may identify significant life events in an electronic calendar application, in emails, in instant messages, etc.

When a significant life event is identified, the electronic concierge application and/or service may further identify a plurality of sources that each have at least one recommendation for executing a type of event corresponding to the significant life event. To identify these sources, the electronic concierge application may query web databases, websites, local storage locations and/or remote storage locations. In some examples, a social resource graph may be utilized to identify resources that are most relevant to a user based on one or more of: user characteristic overlap and/or social proximity to a user.

When a plurality of resources with recommendations for the event type are identified, the electronic concierge application and/or service may utilize the recommendations in those resources to generate one or more itinerary templates for the significant life event. Those one or more itinerary templates may then be surfaced to assist users with event planning. In some examples, the itinerary templates, and elements included therein, may be interacted with to further assist with event planning. For example, individual elements of an itinerary template may be added to an electronic calendar application and/or a task completion application. In other examples, the recommendation elements included in an itinerary template may include additional details that can be drilled down into and/or linked to the source to allow users to research a recommendation in more detail.

Additional examples of the present disclosure describe systems, methods and devices for assisting users with application curation recommendations. Specifically, an electronic concierge application and/or service may provide a user account with administrative rights over one or more secondary devices. For example, an adult may utilize a first device to manage application downloads and/or other activities that her child may initiate on a secondary device. The electronic concierge application and/or service may provide notifications to the first device (or an account associated with that device) when a new application download is initiated on the secondary device and/or attempted to be initiated. In additional examples, the electronic concierge application and/or service may identify a plurality of characteristics associated with a user of the secondary device (e.g., the child device) including at least one of an age of the user and a grade of educational enrollment of the user. Those characteristics may be utilized in association with a social resource graph to identify applications that are relevant to the user of the secondary device. For example, a group of users of an application store may be matched based on their characteristics to the user of the secondary device, and one or more trending application downloads in that group may be identified. The electronic concierge application and/or service may surface the one or more identified trending applications as recommended downloads on the first device (e.g., the adult device). The administrator of the first device may then initiate the downloading of the one or more recommended applications on the secondary device.

The systems, methods, and devices described herein provide technical advantages for assisting with event planning. Processing costs (i.e., CPU cycles) are reduced via the mechanisms described herein at least in that reduced searches are required to identify relevant recommendation resources for creating event itineraries. That is, because the electronic concierge application and/or service described herein can identify resources relevant to an event type, based on application of natural language processing and/or machine learning models, and specific to users, based on social resource graph queries, resources that contain relevant recommendation elements useful for users may be quickly and efficiently identified and combined. Additionally, rather than requiring the processing costs of reloading webpages and other resources multiple times to refer back to those resources, the electronic concierge application and/or service may combine the relevant elements from each of the relevant resources to generate itinerary templates that can be referred back to without reloading the source materials. Processing costs are also reduced via the application recommendation operations described herein. For example, identifying relevant applications to a user based on user characteristics and a social resource graph may minimize the time and resources needed to locate relevant applications.

FIG. 1 is a schematic diagram illustrating an example distributed computing environment 100 for identifying a significant life event from a productivity application and surfacing recommended itineraries for that event. Computing environment 100 includes computing device 102 and computing device 122, which may be the same computing device or different computing devices, network and processing sub-environment 108, and resource sub-environment 114.

Network and processing sub-environment 108 includes network 110, by which any of the computing devices described herein may communicate with one another, and server computing device 112, which is illustrative of a server device that may host one or more applications and/or application services. Resource sub-environment 114 includes web data store 120, document 116, and document 118. Web data store 120 may comprise web data from websites, social media applications, online storage platforms, and/or information generated and/or associated with productivity applications (e.g., word processing applications, spreadsheet applications, email applications, electronic calendar applications, task completion applications, notes applications, presentation applications, digital assistant applications, instant messaging applications, VoIP applications, etc.).

Computing device 102 displays a calendar application user interface 104. Specifically, the electronic calendar application corresponding to user interface 104 is associated with a user, and that user's July 2019 calendar with its scheduled events is displayed. In this example, a cursor is displayed over a calendar event that is scheduled from Monday July 23 through Saturday July 28. Although not indicated in this view of the electronic calendar application, the calendar event that the cursor is displayed over is for a European vacation during those dates, and there is data indicating that information in association with the event in the electronic calendar application.

According to some examples, an electronic concierge application and/or service may be executed by computing device 102, by one or more remote computing devices in network and processing sub-environment 108 (i.e., cloud computing), and/or partially by computing device 102 and partially by one or more remote computing devices in network and processing sub-environment 108. In some examples, the electronic concierge application and/or service may be incorporated in one or more productivity applications. In other examples, the electronic concierge application and/or service may be a separate entity from the productivity applications, but have access to information in, generated by, and/or related to the productivity applications. According to examples, the electronic concierge application and/or service may assist with event execution and perform one or more operations, including: analyzing data from a productivity application associated with a user; identifying, based on the analysis, a significant life event associated with the user; identifying a plurality of sources that each have at least one recommendation for executing a type of event corresponding to the significant life event; generating an itinerary template for the significant life event from a plurality of the recommendations; and surfacing the itinerary template. In additional examples, the electronic concierge application and/or service may assist with application recommendations and perform one or more operations, including: identifying a plurality of characteristics associated with a user of a computing device, wherein the plurality of characteristics includes at least one of: an age of the user and a grade of educational enrollment of the user; identifying a plurality of user groups associated with an application store, wherein each of the plurality of user groups is associated with at least one of: an age range, and a grade of educational enrollment; matching the user to one of the plurality of user groups; identifying a trending application in the matched user group; and surfacing a recommendation on the computing device that the user download the trending application.

In the illustrated example, the electronic concierge service has determined that the European vacation calendar event corresponds to a significant life event. Examples of event types that the electronic concierge service may identify as corresponding to significant life events include: travel events, vacation events, party events, birthday events, anniversary events, wedding events, etc. In some examples, the electronic concierge service may apply one or more machine learning models to natural language inputs associated with electronic calendar events to determine whether those electronic calendar events correspond to significant life events. In additional examples, the electronic concierge service may apply one or more machine learning models to metadata associated with electronic calendar events to determine whether those electronic calendar events correspond to significant life events. In other examples, users may manually tag electronic calendar events as significant life events that the electronic concierge service will then automatically classify as significant life events. According to some examples, one or more of the models applied to the natural language and/or metadata associated with the electronic calendar events by the electronic concierge service may be trained to more accurately identify significant life events based on a feedback loop (e.g., when a user manually marks a calendar event as a significant life event that was not previously classified as a significant life event, when a user unmarks an event as a significant life event that was automatically classified by the electronic concierge service).

Although in the illustrated example the vacation event is identified as being a significant life event via analysis of electronic calendar event data, the electronic concierge application and/or service may analyze data from applications other than the electronic calendar application to determine whether data corresponding to those other applications relates to a significant life event. For example, the electronic concierge application and/or service may analyze natural language and/or metadata associated with electronic messaging applications (e.g., email, instant message), notes applications, word processing applications, web browser applications, task completion applications, etc. and determine whether information generated by and/or associated with those applications corresponds to significant life events.

According to examples, when an electronic calendar event (or content in a different application—e.g., natural language in an email, a task in a task completion application, etc.) is identified as being a significant life event, the electronic concierge service may surface an itinerary assistant for creating itineraries for the event. In some examples, the itinerary assistant may be automatically surfaced upon the electronic concierge service identifying an event as a significant life event. In other examples, the itinerary assistant may be surfaced upon receiving an interaction associated with the electronic calendar event. For example, when a cursor is hovered over the electronic calendar event element, a mouse click is registered over an electronic calendar event element, and/or a spoken command is received, an itinerary assistant user interface element may be surfaced for generating and surfacing event itineraries corresponding to the electronic calendar event. Thus, in this example when the cursor is hovered over the European vacation event element, the electronic concierge service causes pop-up window 106 to be surfaced on computing device 102. Pop-up window 106 states: "Itinerary Assistant—Would you like to see recommended itineraries for this trip?" "Yes", "No". Pop-up window 106 and its content is but one example of how the electronic concierge application and/or service may be prompted to generate itineraries for an event. Other layouts, selectable elements and user interface configurations are contemplated as would be understood by one of skill in the art. In some examples, the electronic concierge application and/or service may automatically generate one or more itineraries when it identifies a significant life event.

In the illustrated example, a user selects the "Yes" element of pop-up window 106 and the electronic concierge application and/or service generates a plurality of trip itineraries for the European vacation. The electronic concierge service may generate the itineraries based on analysis of one or more resources, such as resources included in resource sub-environment 114. The electronic concierge service may identify websites that have recommendations and/or itineraries corresponding to the identified significant life event and incorporate some or all of that information in itineraries that it generates. For example, the electronic concierge application and/or service may perform web keyword and/or phrase searches corresponding to an identified significant life event and identify relevant websites that have recommendations and/or itineraries based on those searches. In additional examples, the electronic concierge application and/or service may query social media websites and/or databases to determine whether they include content relevant to generation of an event itinerary for the identified significant life event (e.g., identify whether friends of the user that the recommendation will be generated for have posted recommendations, articles, and/or other resources that contain relevant content). In other examples, the electronic concierge application and/or service may automatically search one or more websites for content relevant to an itinerary based on an identified type of the significant life event (e.g., search a restaurant recommendation website for events that potentially involve dining out, search a travel recommendation website for travel events, search party planning website for party events, etc.). In additional examples, the electronic concierge application and/or service may perform keyword and/or phrase searches of local files/directories (e.g., stored locally on computing device 102/122) to determine whether there are resources such as word processing document 116 and PDF document 118 that contain information that is relevant to generation of an event itinerary for the identified significant life event. In still other examples, the electronic concierge application and/or service may perform keyword and/or phrase searches of remote storage locations (e.g., web data store 120, file storage services, etc.) to determine whether there are resources that contain information that is relevant to generation of an event itinerary for the identified significant life event.

In examples, the electronic concierge service may generate one or more event itineraries for identified significant life events based on the relevant content that it identified as discussed above and those itineraries may be surfaced for viewing and/or further interaction. In the illustrated example, the electronic concierge application and/or service has generated three different itineraries for the European vacation event (Europe Itinerary A, Europe Itinerary B, Europe Itinerary C). The electronic concierge application and/or service may have identified from the electronic calendar event and/or other analyzed content from a same or different productivity application (e.g., email application, task completion application) that the user intends to visit Paris on Monday July 23 and Amsterdam on Tuesday July 24. As such, the electronic concierge application and/or service has identified relevant content/recommendations from the resources it analyzed for those cities and/or for those dates.

The electronic concierge application and/or service has surfaced pop-up window 102, which states: "Trip Itineraries—1. Europe Itinerary A—2. Europe Itinerary B—3. Europe Itinerary C". Each of those itineraries in pop-up window 102 may be selectable for surfacing additional information/recommendations specific to the corresponding selected itinerary. Thus, when the first itinerary (Europe Itinerary A) is selected, fly-out window 102 is surfaced on computing device 122. Fly-out window 102 displays content that was identified from the one or more resources that the electronic concierge application and/or service determined where relevant to the significant life event. Each element displayed in fly-out window 102 may have been identified from one source or a plurality of sources. Fly-out window 102 states: "1. Europe Itinerary A—Monday (Paris) [hotel red] [sightseeing red] [dinner red]—Tuesday (Amsterdam) [hotel red] [sightseeing red] [dinner rec]". One or more of the elements displayed in fly-out window 102 may be selectable for presenting additional details corresponding to the selected element.

FIG. 2 illustrates a computing environment 200 for interaction with a surfaced itinerary and corresponding addition of a recommendation element from the itinerary to an electronic calendar application. Computing environment 200 includes computing device 202 and computing device 212. Those computing devices may be the same computing device or different computing devices associated with a same user's electronic calendar account. In this example, the itineraries that the electronic concierge service generated for the Europe vacation event discussed with regard to FIG. 1 are surfaced on computing device 202. In this example, the three trip itineraries are displayed in pop-up window 206 and additional details for "Europe Itinerary A" are displayed in fly-out window 208. For each of the itinerary recommendations included and displayed in fly-out window 208 there is an accompanying user interface element that is selectable for adding the corresponding recommendation to the user's electronic calendar. In this example the selectable user interface elements are plus signs. It should be understood that other elements (e.g., different shapes, colors, patterns, different interaction mechanisms) and user interface configurations for accomplishing the same are contemplated and are within the scope of the present disclosure. Thus, when a selection of the user interface element is received (e.g., a mouse click on the plus sign, a touch input on the plus sign), an option is surfaced for adding the corresponding recommendation to the user's electronic calendar. In this specific example, a mouse click is received at the plus sign next to the [hotel red] for Paris, and pop-up window 210 is then surfaced, which states: "Add to Calendar?"—"Yes", "No".

In the illustrated example a selection of the "Yes" user interface element has been received and a hotel stay corresponding to the [hotel red] in Europe Itinerary A has been added to the user's electronic calendar on Monday July 23 as illustrated by new electronic calendar event 216. In some examples, the [hotel red] information may be added to the existing calendar event for the Europe trip (e.g., in the body of the calendar event information, in the location of the calendar event information). New electronic calendar event 216 may include information corresponding to the hotel content that the electronic concierge application and/or service identified from the source it obtained information related to that recommendation at and/or content from one or more secondary sources. For example, the hotel identity/name may have been identified from a travel recommendation webpage related to Paris, the address and/or phone number for the hotel may have been identified from the hotel's website and/or a maps website, and reviews and/or ratings for the hotel may have been identified from a hotel review website. Some or all of that information may be added or otherwise associated with new electronic calendar event 216.

Figure 3:
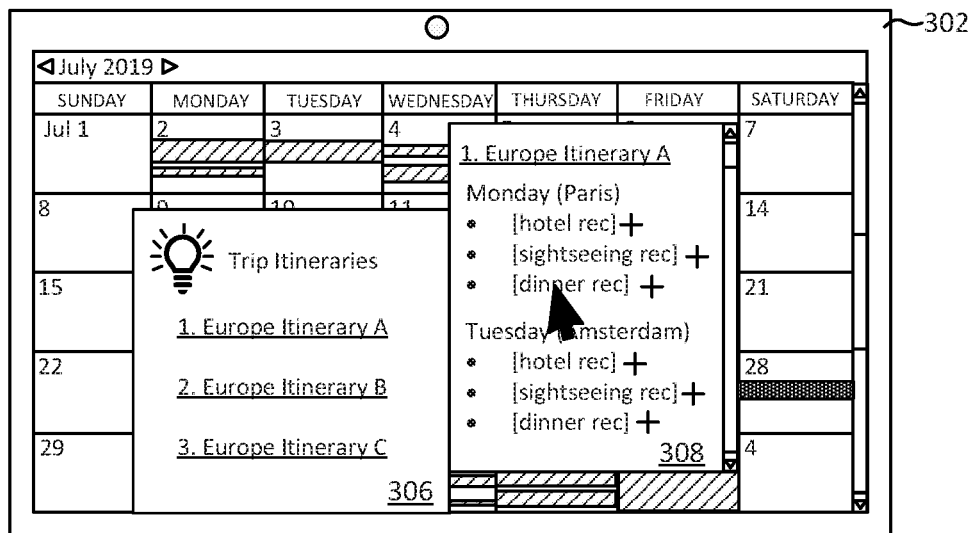
FIG. 3 illustrates a computing environment for interaction with a surfaced itinerary recommendation element for the displaying of additional information related to that recommendation element.
Figure 3:
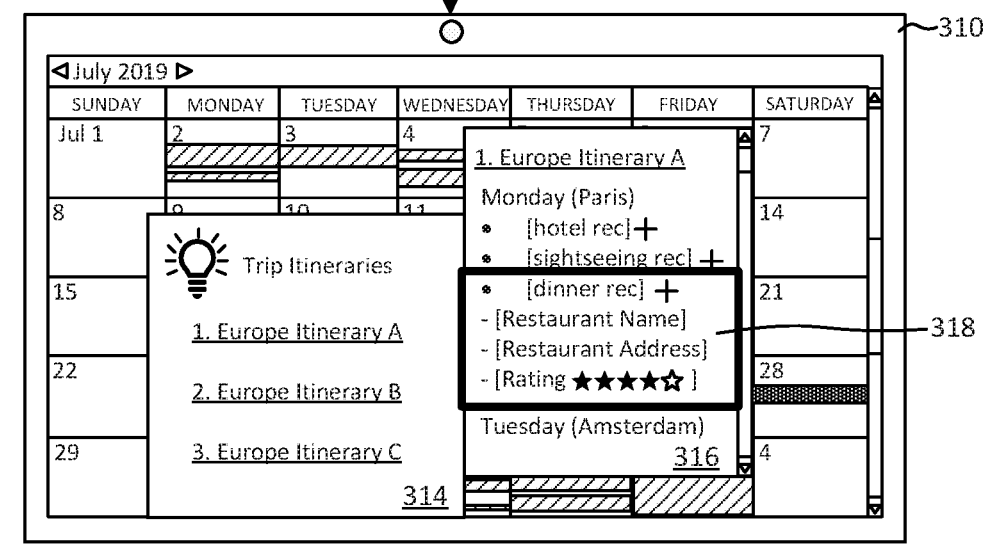

FIG. 3 illustrates a computing environment 300 for interaction with a surfaced itinerary recommendation element for the displaying of additional information related to that recommendation element. Computing environment 300 includes computing device 302 and computing device 310. Those computing devices may be the same computing device or different computing devices associated with a same user's electronic calendar account. In this example, the itineraries that the electronic concierge service generated for the Europe vacation event discussed in relation to FIG. 1 and FIG. 2 are surfaced on computing device 302. In this example, the three itineraries are displayed in pop-up window 306 and additional details for "Europe Itinerary A" are displayed in fly-out window 308. One or more of the recommendation elements in the itinerary may be selectable for displaying additional information about the corresponding recommendation. A selection of a recommendation element in the itinerary may be made via various mechanisms (e.g., mouse click, touch input, verbal command) In this example, a selection of the [dinner rec] recommendation element is made via a mouse click. The selection of the [dinner rec] recommendation element initiates the display of additional information 318 related to that recommendation as illustrated by fly-out window 318 on computing device 310.

The additional information 318 that is displayed includes the restaurant's name, the restaurant's address, and a rating of the restaurant (four out of five stars). The additional information 318 may be identified by the electronic concierge service from one or more resources (e.g., one or more websites, one or more documents, etc.). In additional examples, one or more elements included in additional information 318 may be further selectable for performing follow-up actions (e.g., selecting the [restaurant name] element may cause a web browser to automatically navigate to the restaurant's homepage or menu, selecting the [restaurant address] element may cause a maps application to be surfaced with directions from a user's current location and the restaurant's information automatically populated in the application, selecting the [rating] element may cause a web browser to automatically navigate to a webpage with additional ratings and/or reviews of the restaurant).

Figure 4:
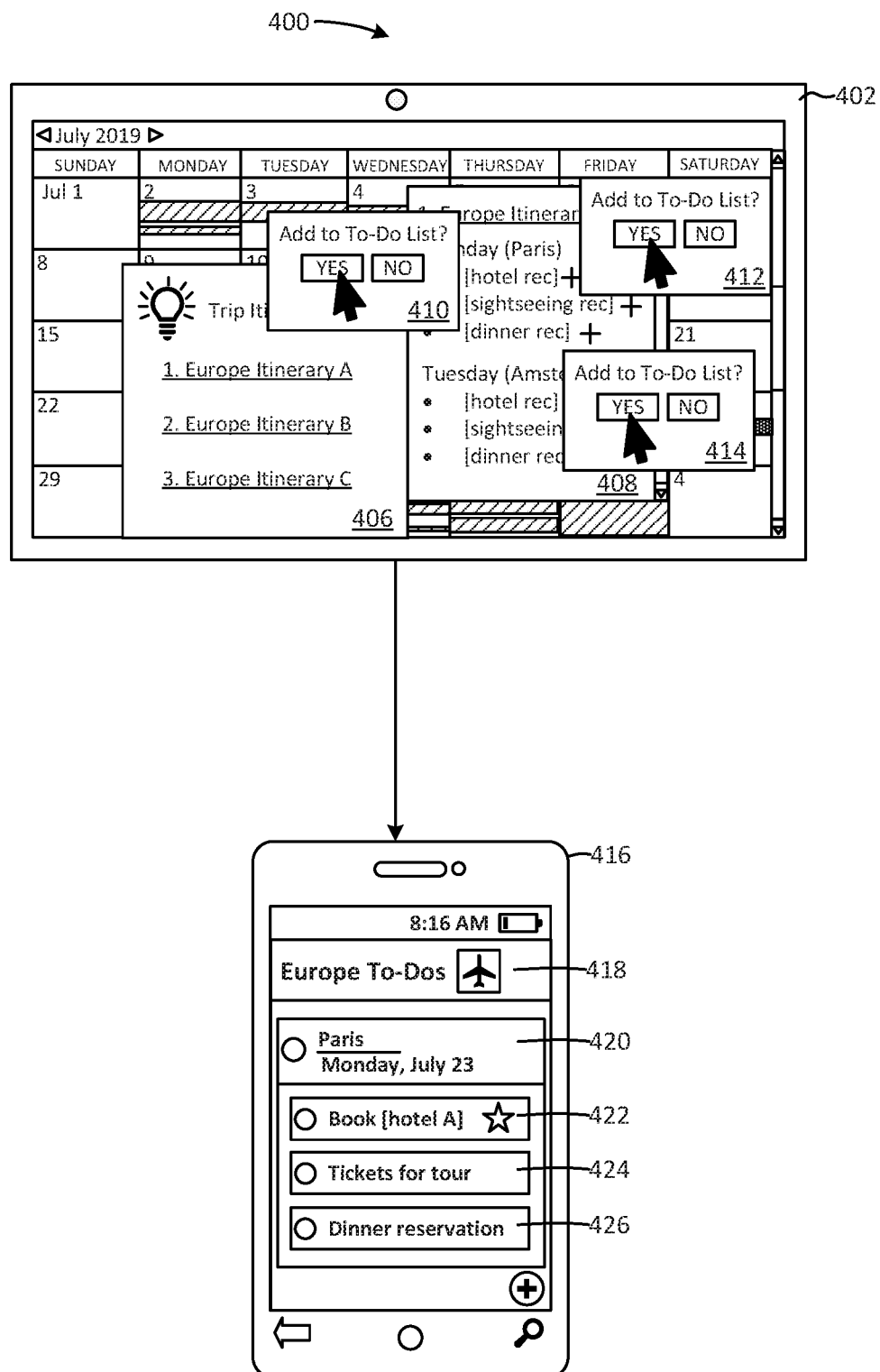
FIG. 4 illustrates a computing environment for interaction with a plurality of surfaced itinerary recommendation elements and addition of tasks corresponding to those recommendation elements to a task completion application.

FIG. 4 illustrates a computing environment 400 for interaction with a plurality of surfaced itinerary recommendation elements and addition of tasks corresponding to those recommendation elements to a task completion application. Computing environment 400 includes computing device 402 and computing device 416. Computing device 402 and computing device 416 are both associated with a same user account. In this example, the user account provides application synching across devices (e.g., syncing between an electronic calendar application, an electronic concierge application, and/or a task completion application). The itineraries that the electronic concierge service generated for the Europe vacation event discussed above in relation to FIG. 1, FIG. 2 and FIG. 3 are surfaced on computing device 402. In this example, the three trip itineraries are displayed in pop-up window 406 and additional details for "Europe Itinerary A" are displayed in fly-out window 408.

One or more of the recommendation elements included in the itinerary may be selectable for adding the corresponding recommendation to a task completion application. For example, a user may select the plus element next to a recommendation and thereby cause an option to add the corresponding recommendation to a task completion application. A plus sign is but one example of a selectable element that may be interacted with for surfacing such an option and it should be understood that other elements (e.g., different shapes, colors, patterns, different interaction mechanisms) and user interface configurations for accomplishing the same are contemplated and are within the scope of the present disclosure. For illustrative purposes there are three pop-up windows displayed on computing device 402 corresponding to three separate recommendation element selections.

Pop-up window 410 may have been surfaced based on receiving a selection of the [hotel red] recommendation element in fly-out window 408. Receiving a selection of the "Yes" element in pop-up window 410 may cause a task associated with the hotel to be added to a task completion application associated with a same user account as the user account linked to the electronic calendar application. Thus, the task completion application user interface displayed on computing device 416 for the "Europe To-Dos" has new task 422 to "Book [hotel A]" added under the "Paris—Monday, July 23" heading 420.

Pop-up window 412 may have been surfaced based on receiving a selection of the [sightseeing red] recommendation element in fly-out window 408. Receiving a selection of the "Yes" element in pop-up window 412 may cause a task associated with the sightseeing recommendation to be added to a task completion application associated with a same user account as the user account linked to the electronic calendar application. Thus, the task completion application user interface displayed on computing device 416 for the "Europe To-Dos" has new task 424 added under the "Paris—Monday, July 23" heading 420. New task 424 corresponding to the [sightseeing rec] recommendation element states "Tickets for tour" (e.g., buy tickets for the sightseeing rec, look into availability of tickets for the sightseeing rec).

Pop-up window 414 may have been surfaced based on receiving a selection of the [dinner rec] recommendation element in fly-out window 408. Receiving a selection of the "Yes" element in pop-up window 412 may cause a task associated with the dinner recommendation to be added to a task completion application associated with a same user account as the user account linked to the electronic calendar application. Thus, the task completion application user interface displayed on computing device 416 for the "Europe To-Dos" has new task 426 added under the "Paris—Monday, July 23" heading 420. New task 426 corresponding to the [dinner rec] recommendation element states "Dinner reservation" (e.g., make a dinner reservation at the recommended restaurant, see if dinner reservations are available for the evening in question).

According to some examples, a user may have manually created the "Europe To-Dos" task completion list in the task completion application, and the new task elements may be automatically added to the manually created task completion list upon receiving selection of the corresponding recommendation elements in fly-out window 408. In other examples, the "Europe To-Dos" task completion list may be automatically created and/or automatically populated with the "Paris Monday, July 23" heading 420 when a first selection is received to add a recommendation element to the task completion application.

Figure 5:
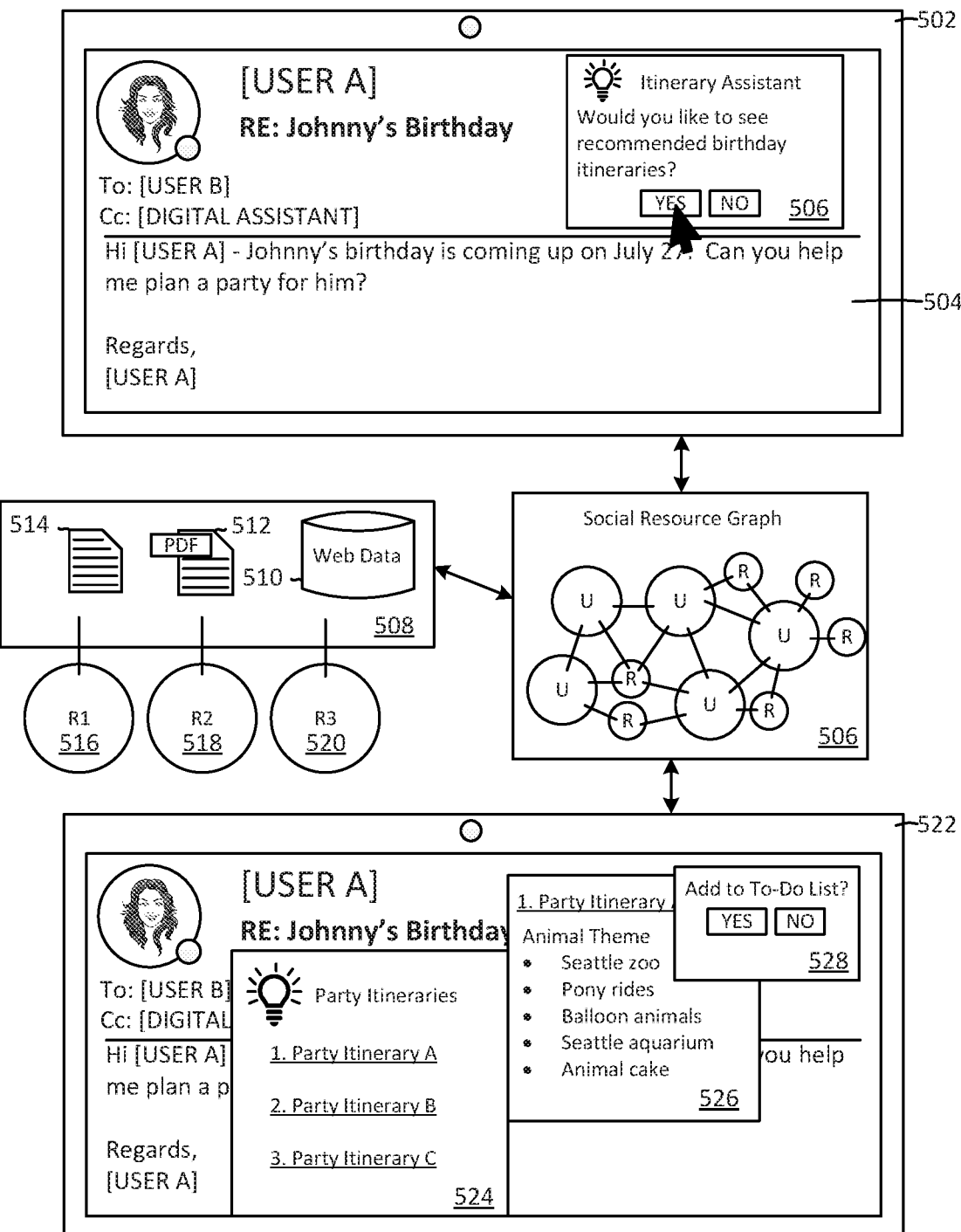
FIG. 5 is a schematic diagram illustrating an example distributed computing environment for identifying a signification life event from natural language in a productivity application and surfacing recommended itineraries for that event.

FIG. 5 is a schematic diagram illustrating an example distributed computing environment 500 for identifying a signification life event from natural language in a productivity application and surfacing recommended itineraries for that event. Computing environment 500 includes computing device 502 and computing device 522, which may be the same computing device or different computing devices, social resource graph sub-environment 506, and resources sub-environment 508.

Computing device 102 displays an email application user interface 504. Specifically, an email from [USER A] to [USER B] (and [DIGITAL ASSISTANT] Cced) is displayed. The email includes "Johnny's Birthday" in the subject field, and the body states: "Hi [USER A]—Johnny's birthday is coming up on July 27. Can you help me plan a party for him? Regards, [USER A]". An electronic concierge application and/or service may be provided with access to the email application executed on computing device 502. In some examples, the electronic concierge application and/or service may be provided with access to the email application via the digital assistant that was Cced in the email. The electronic concierge application and/or service may apply one or more natural language processing and/or machine learning models to emails received and/or sent from the email application to determine whether they likely relate to a significant life event.

In this example, the electronic concierge application and/or service determines that "Johnny's birthday" corresponds to a significant life event, and therefore it surfaces an option to have recommended birthday itineraries generated and surfaced for the birthday. Thus, in this example, pop-up window 506 is surfaced, which states: "Itinerary Assistant—Would you like to see recommended birthday itineraries?" "Yes", "No". According to examples, the electronic concierge application and/or service may attempt to identify content for recommending to users in itineraries that is specific to users by utilizing a social resource graph, such as illustrated in social resource graph sub-environment 506. For example, the electronic concierge application and/or service, which knows the identity of the user associated with the email application, may maintain or have access to a social resource graph comprised of user nodes and resource nodes. The user nodes may correspond to users that a user interacts with (e.g., emails, messages, calls, etc.) and/or users that a user is connected to via one or more social media services (e.g., connected on LinkedIn, "friends" on a social media service). The resources nodes in the graph may correspond to resources (e.g., document 514, document 512, webpages, links, reviews, etc.) that users corresponding to the user nodes generated, posted and/or sent electronically. The resources in the social resource graph may be maintained in one or more locations, such as in web data store 510 in resources sub-environment 508. The electronic concierge application and/or service may thus analyze the social resource graph to identify resources that contain recommendations that are most relevant to specific users based on the relative closeness of the user nodes to the user that a recommendation is being provided to. For example, if [USER B] has received thirty emails from a user in a month, and is connected with that user on one or more social media services, content/resources that the user has generated, posted and/or sent electronically are likely to be more relevant to [USER B] than content/resources associated with a user that [USER B] has never interacted with and is not connected to via social media. In some examples, the social resource graph may categorize users based on characteristics (e.g., age, location, education grade of enrollment, etc.) and thus users that have similar/overlapping characteristics may be closer together in the graph than users that do not have similar/overlapping characteristics.

In some examples, the electronic concierge application and/or service may identify user identities that are referenced in electronic documents and identify relevant resources for generating itinerary recommendations based on those identities and characteristics. For example, "Johnny" is referenced in the email displayed on computing device 502. The electronic concierge application and/or service may determine whether it can locate a user account associated with "Johnny". If the electronic concierge application can locate a user account associated with "Johnny" it may utilize that user's characteristics to identify relevant resources via the social resource graph. In this example, based on analysis of the social resource graph, the electronic concierge service has identified three resources that are most relevant to planning the birthday party in question—resource 1 516, resource 2 518 and resource 3 520.

When a selection is made of the "Yes" element in pop-up window 506, the electronic concierge service may generate and surface one or more itineraries based on relevant resources it has located. In this example, pop-up window 524 is surfaced on computing device 522, which states "Party Itineraries—1. Party Itinerary A—2. Party Itinerary B—3. Party Itinerary C". In this example, a selection has been made of the first party itinerary (Party Itinerary A) and fly-out window 526 is surfaced, which includes additional details identified from the relevant resources (R1-R3). Specifically, fly-out window 526 states: "1. Party Itinerary A—Animal Theme—Seattle zoo—Pony rides—Balloon animals—Seattle aquarium—Animal cake". Pop-up window 528 may also be surfaced, which provides a selectable option to add one or more of the recommendation elements included in fly-out window 526 to a task completion application to-do list.

Figure 6:
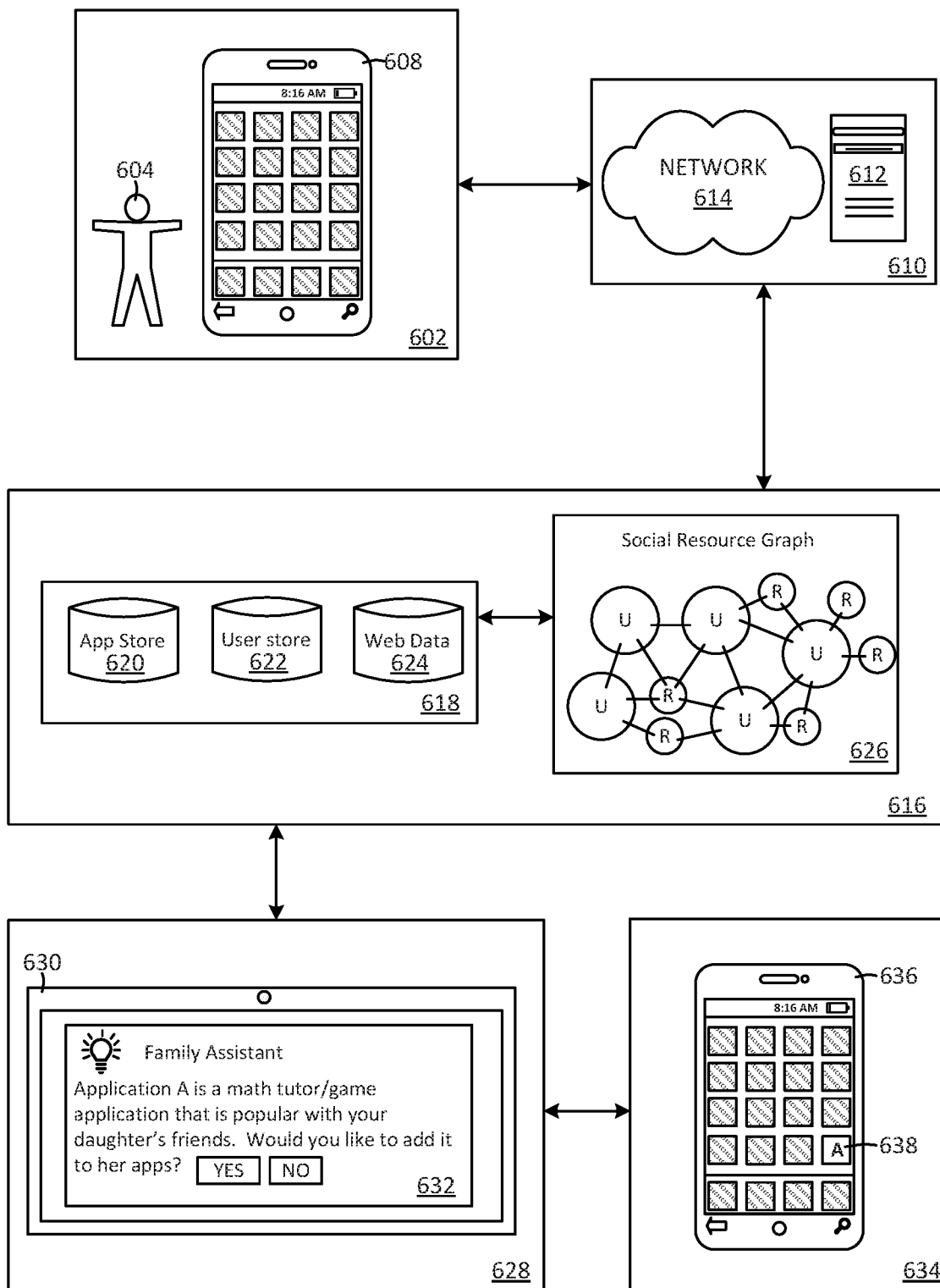
FIG. 6 is a schematic diagram illustrating an example distributed computing environment for surfacing application download recommendations to be installed on family members' devices based on user characteristics and a social resource graph.

FIG. 6 is a schematic diagram illustrating an example distributed computing environment 600 for surfacing application download recommendations to be installed on family members' devices based on user characteristics and a social resource graph. Computing environment 600 includes first child device sub-environment 602, network and processing sub-environment 610, social resource graph sub-environment 616, adult device sub-environment 628, and second child device sub-environment 634. Any of the devices described herein may communicate with one another via network 614 network and processing sub-environment 610. Server computing device 610 in network and processing sub-environment may host one or more cloud-based productivity applications, an electronic concierge application and/or service, and/or an app store.

User 604 in first child device sub-environment 602 is a child associated with computing device 608. An adult user account associated with computing device 630 in adult device sub-environment may have access and/or be sent notifications regarding applications that are installed on computing device 608. In some examples, the devices may be associated via an electronic concierge application and/or service. For example, if a new application is downloaded on computing device 608, a notification may be surfaced on computing device 630 via the electronic concierge service.

The electronic concierge application and/or service may surface application recommendations on the parent device (e.g., computing device 630) and/or the child device (e.g., computing device 608) based on the relationship between the users (user accounts) via the electronic concierge application and/or service. The electronic concierge application and/or service may identify applications to recommend to users based on analyzing social resource graph 626 and one or more resource stores associated with that graph (e.g., app store 620, user store 622, web data store 624). That is, the electronic concierge application and/or service may have been provided with access (e.g., via permission settings) to one or more characteristics of the child user 604. Those characteristics may be anonymized to protect the identity of the child. In some examples, the characteristics may include one or both of an age of the child user 604 and an educational grade of enrollment of the child user 604. The characteristics may include additional information (e.g., state of origin, country of origin, etc.). Utilizing the social resource graph 626 for the child user 604, the electronic concierge application and/or service may identify applications downloads that are trending from the app store 620 based on user characteristic overlap. For example, if Application A is a trending application download for users that are with an age range of child user 604 and an educational grade of enrollment range of child user 604, the electronic concierge application and/or service may surface a recommendation regarding Application A to the adult user via computing device 630. In other examples, the recommendation may be based on resources associated with users in the social graph and/or those demographics (e.g., articles recommending applications for users of an age group and/or educational grade).

In this example, the electronic concierge service has identified that Application A is trending and relevant to child user 604. As such, it causes recommendation 632 to be surfaced on computing device 630. Recommendation 632 states: "Family Assistant—Application A is a math tutor/game application that is popular with your daughter's friends. Would you like to add it to her apps?"—"Yes", "No". If a selection is made of the "Yes" element, the child's computing device (device 636) may be caused to automatically download Application A from app store 620. In some examples, a preview version of the recommended application and/or additional details for the recommended application may additionally or alternatively be surfaced on the parent computing device.

Figure 7:
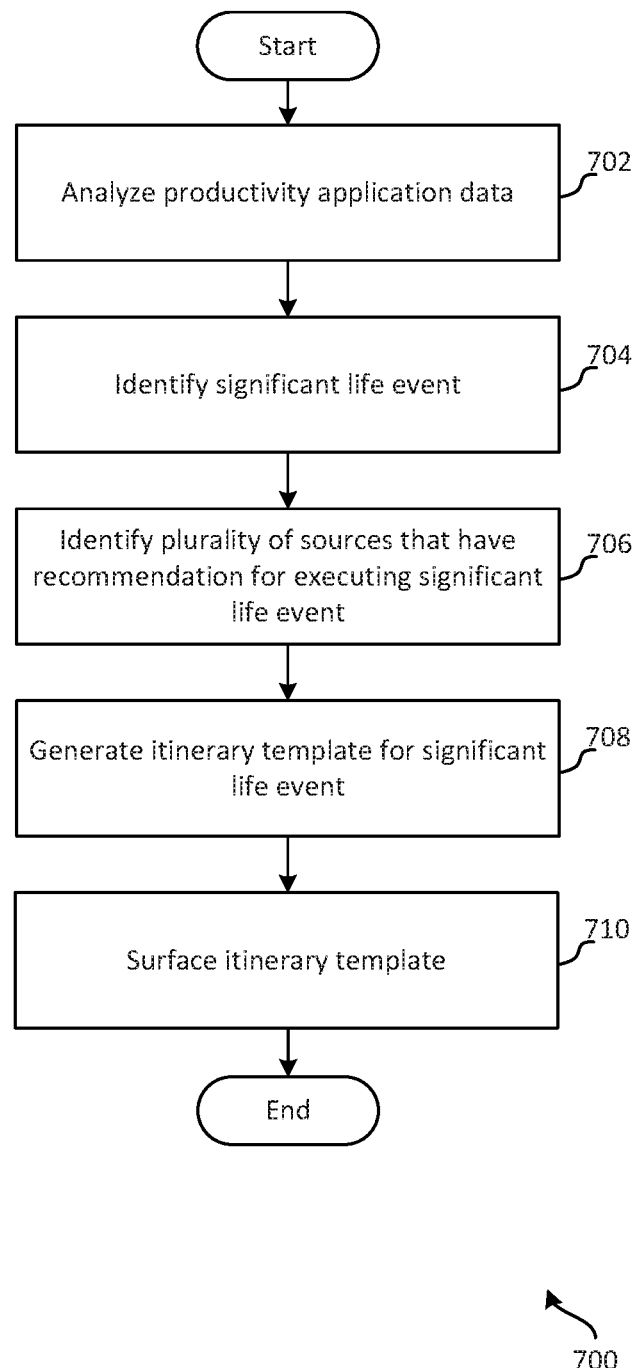
FIG. 7 is an exemplary method for assisting with event execution.

FIG. 7 is an exemplary method 700 for assisting with event execution. The method 700 begins at a start operation and flow continues to operation 702.

At operation 702 data from a productivity application associated with a user is analyzed. The data may include documents generated utilizing the productivity application (e.g., emails, word processing documents, notes, etc.), information added to the productivity application (e.g., electronic calendar events, to-dos in a task completion application, etc.), and/or metadata associated with the productivity application. The analysis may comprise performing a keyword and/or phrase search. The analysis may additionally or alternatively comprise applying one or more natural language processing and/or machine learning models to the data to determine whether a significant life event may be identified.

From operation 702 flow continues to operation 704 where a significant life event associated with the user is identified based on the analysis performed at operation 702. The significant life event may comprise one or more of: a travel event, a vacation event, and a party event, for example. In some examples, users may manually set which event types they would like to have an electronic concierge application and/or service mark as a significant life event for additional processing.

From operation 704 flow continues to operation 706 where a plurality of sources that each have at least one recommendation for executing a type of event corresponding to the significant life event are identified. The resources may be identified from web searches, local storage searches and/or remote storage searches performed by an electronic concierge application and/or service based on a topical category of the identified significant life event. The resources may include websites, documents, articles, and reviews, for example. In examples where the significant life event is a vacation travel event the at least one recommendation may relate to one or more of: a hotel recommendation, a restaurant recommendation, and a point of interest recommendation. In examples where the significant life event is a party event the at least one recommendation may relate to one or more of: a theme for the party event, a location for the party event, food for the party event, and drinks for the party event.

From operation 706 flow continues to operation 708 where an itinerary template for the significant life event is generated from a plurality of the recommendations. For example if a first resource recommends that a user eat at a first restaurant during a vacation and a second resource recommends that a user stay at a specific hotel during a vacation, those recommendation elements may both be added to a single itinerary template. Additional details associated with those recommendations may also be included with the itinerary template. The additional details may be identified in the same resources or from secondary resources (e.g., an address and/or reviews for the restaurant or hotel may be identified from the original resource or from a different resource).

From operation 708 flow continues to operation 710 where the itinerary template is surfaced. The itinerary template may be surfaced in an application, by an operating system, by a widget, by a digital assistant, and/or in a web browser. In examples, elements in the template may be interacted with. For example, a user may add certain recommendation elements from an itinerary template to one or more productivity applications (e.g., task completion application, electronic calendar application). In another example, recommendation elements may be drilled down into to view additional information corresponding to those recommendation elements. In still other examples, recommendation elements included in an itinerary template may link back to their source materials for ease of access by a viewing/planning user.

From operation 710 flow moves to an end operation and the method 700 ends.

Figure 8:
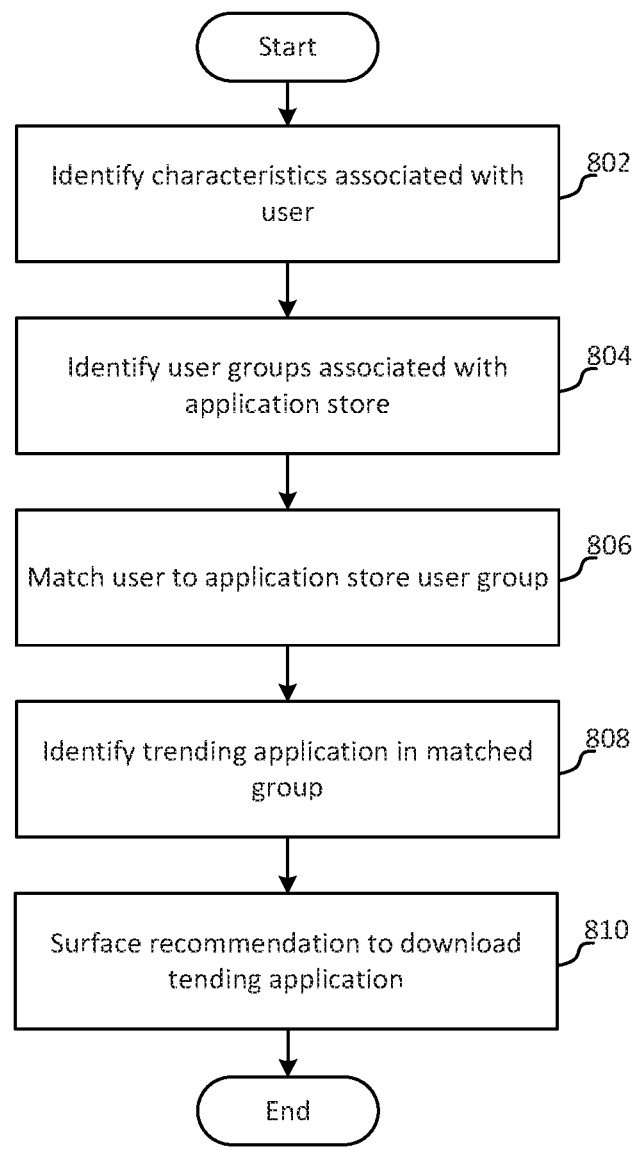
FIG. 8 is an exemplary method for assisting with application recommendations.

FIG. 8 is an exemplary method 800 for assisting with application recommendations. The method 800 begins at a start operation and flow moves to operation 802.

At operation 802 a plurality of characteristics associated with a user of a computing device are identified. The plurality of characteristics may include at least one of: an age of the user and a grade of educational enrollment of the user. Other characteristics may also be identified (e.g., age of user, gender of user, locational information of user, etc.). In examples, the user may give explicit permission to provide information about those characteristics to an electronic concierge service.

From operation 802 flow continues to operation 804 where a plurality of user groups associated with an application store is identified. In examples, each of the plurality of user groups may be associated with at least one of: an age range, and a grade of educational enrollment.

From operation 804 flow continues to operation 806 where the user is matched to one of the plurality of user groups. The user may be matched to a user group based on an overlap of the user's characteristics and characteristics of users in the matched group.

From operation 806 flow continues to operation 808 where a trending application in the matched user group is identified. The application may be identified as being trending based on a most downloaded application percentage by the matched user group and/or a top number value of downloaded applications by the matched user group. According to additional examples, a plurality of educational topics corresponding to the matched user group may be identified (e.g., topics, classes, etc. that users in an age group and/or grade group corresponding to the matched user group study in school). One or more top-rated applications related to the identified plurality of educational topics may then be identified.

From operation 808 flow continues to operation 810 where a recommendation that the user download the trending application and/or the top-rated application related to the identified plurality of educational topics is surfaced on the computing device. For example, the administrator (e.g., parent user) may receive a recommendation to have the application downloaded on the secondary device (e.g., child device).

From operation 810 flow moves to an end operation and the method 800 ends.

Figure 9:
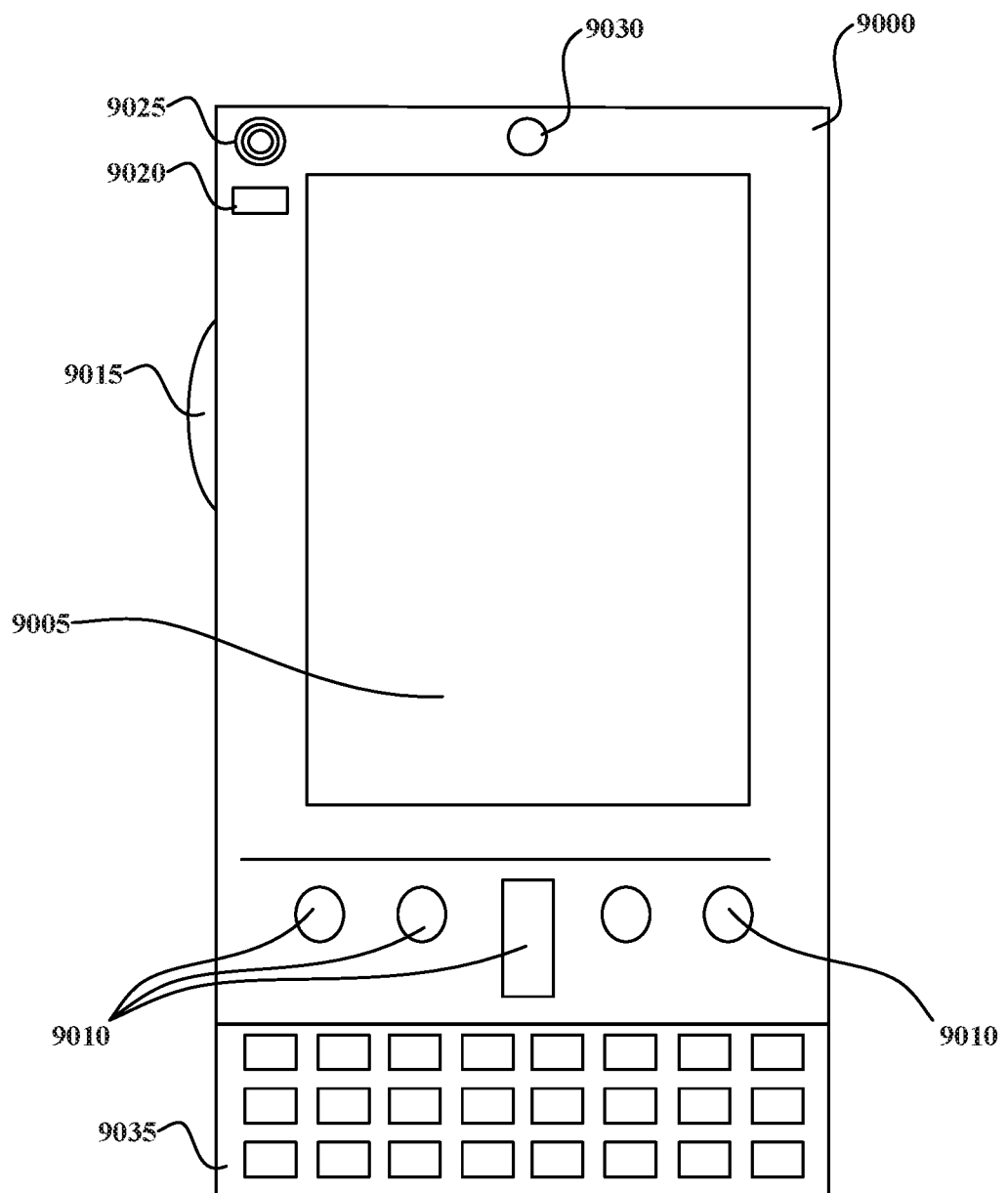
FIGS. 9 and 10 are simplified diagrams of a mobile computing device with which aspects of the disclosure may be practiced.
Figure 10:
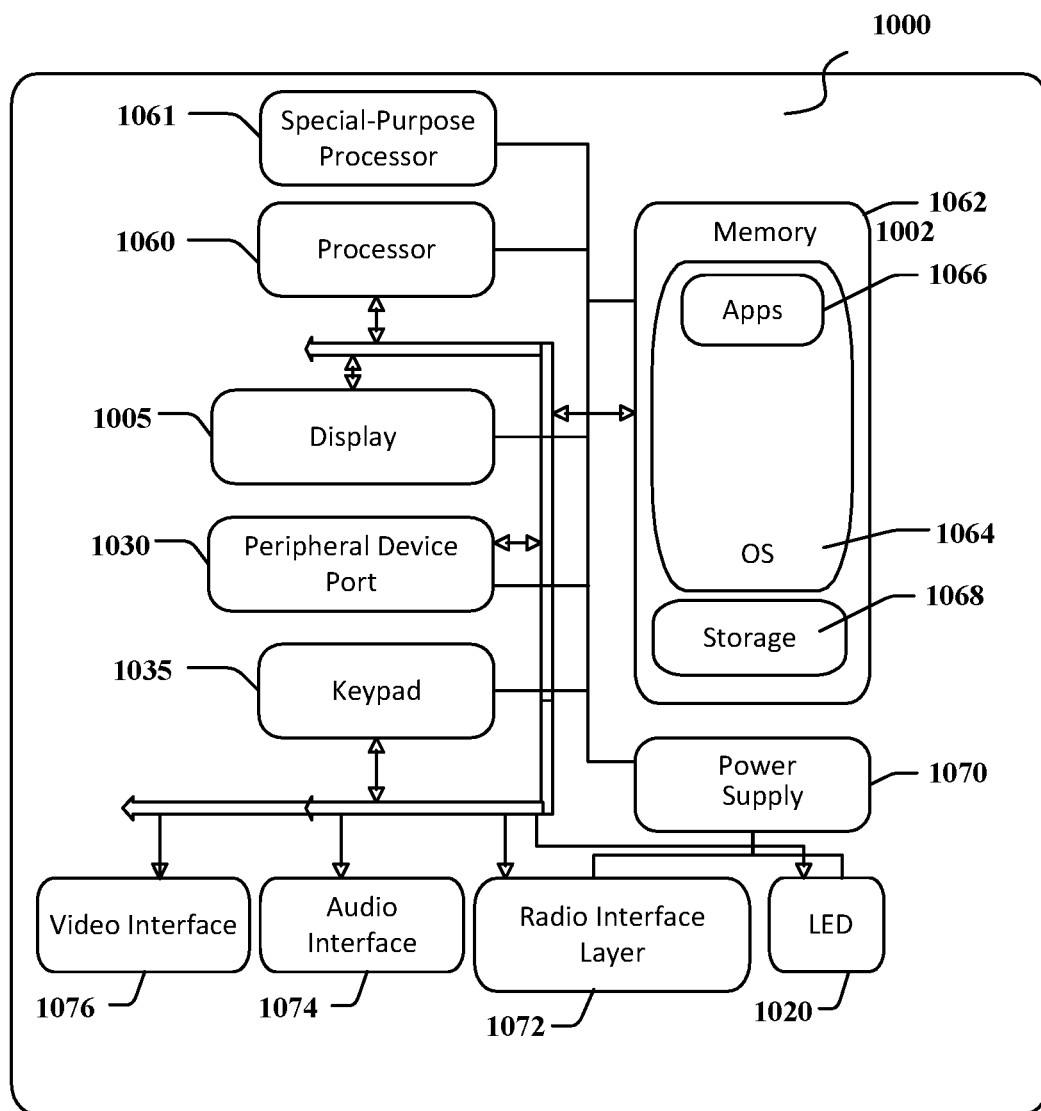

FIGS. 9 and 10 illustrate a mobile computing device 900, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 9, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or fewer input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 10 is a block diagram illustrating the architecture of one aspect of a mobile computing device. That is, the mobile computing device 1000 can incorporate a system (e.g., an architecture) 1002 to implement some aspects. In one embodiment, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000, including instructions for providing and operating a digital assistant computing platform.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 920 may be used to provide visual notifications, and/or an audio interface 1074 may be used for producing audible notifications via the audio transducer 925. In the illustrated embodiment, the visual indicator 920 is a light emitting diode (LED) and the audio transducer 925 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 925, the audio interface 1074 may also be coupled to a microphone to receive audible input, such as to facilitate a telephone conversation. In accordance with embodiments of the present disclosure, the microphone may also serve as an audio sensor to facilitate control of notifications, as will be described below. The system 1002 may further include a video interface 1076 that enables an operation of an on-board camera 930 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10 by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
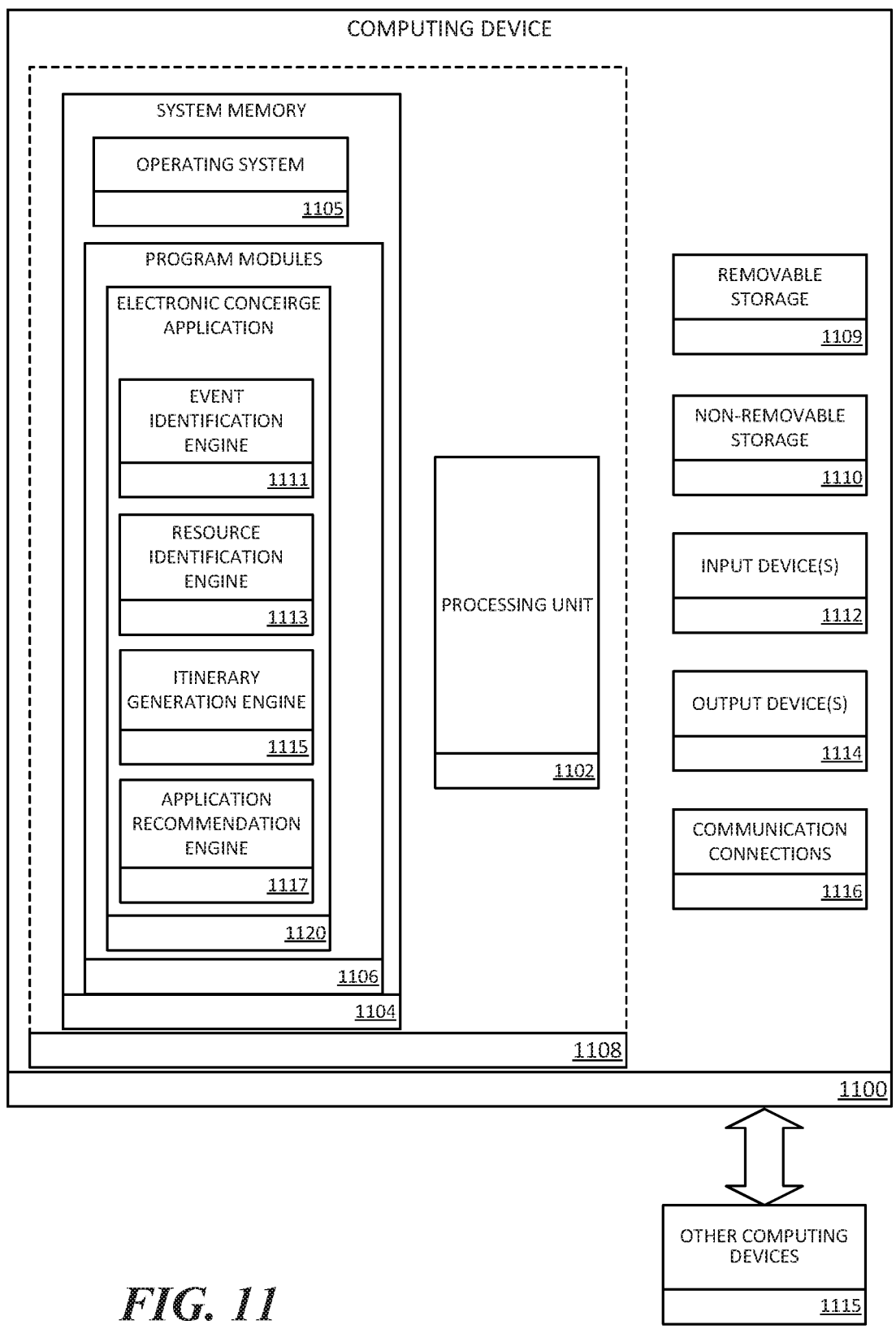
FIG. 11 is a block diagram illustrating example physical components of a computing device with which aspects of the disclosure may be practiced.

FIG. 11 is a block diagram illustrating physical components (e.g., hardware) of a computing device 1100 with which aspects of the disclosure may be practiced. The computing device components described below may have computer executable instructions for generating template itineraries via the identification of significant life events, and recommending applications for download. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running one or more digital assistant programs. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., electronic concierge application 1120) may perform processes including, but not limited to, the aspects, as described herein. According to examples, event identification engine 1111 may perform one or more operations associated with applying natural language processing, keyword or phrase querying, and/or machine learning models to application data to identify significant life events. Resource identification engine 1113 may perform one or more operations associated with identifying content that is topically relevant to a user's significant life event, and in some examples, doing so utilizing a social resource graph. Itinerary generation engine 1115 may perform one or more operations associated with generating one or more template itineraries from elements included in the identified resources. Application recommendation engine 1117 may perform one or more operations associated with identifying trending applications relevant to a user and providing recommendations to an administrator account to have the identified applications downloaded to an secondary device.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12:
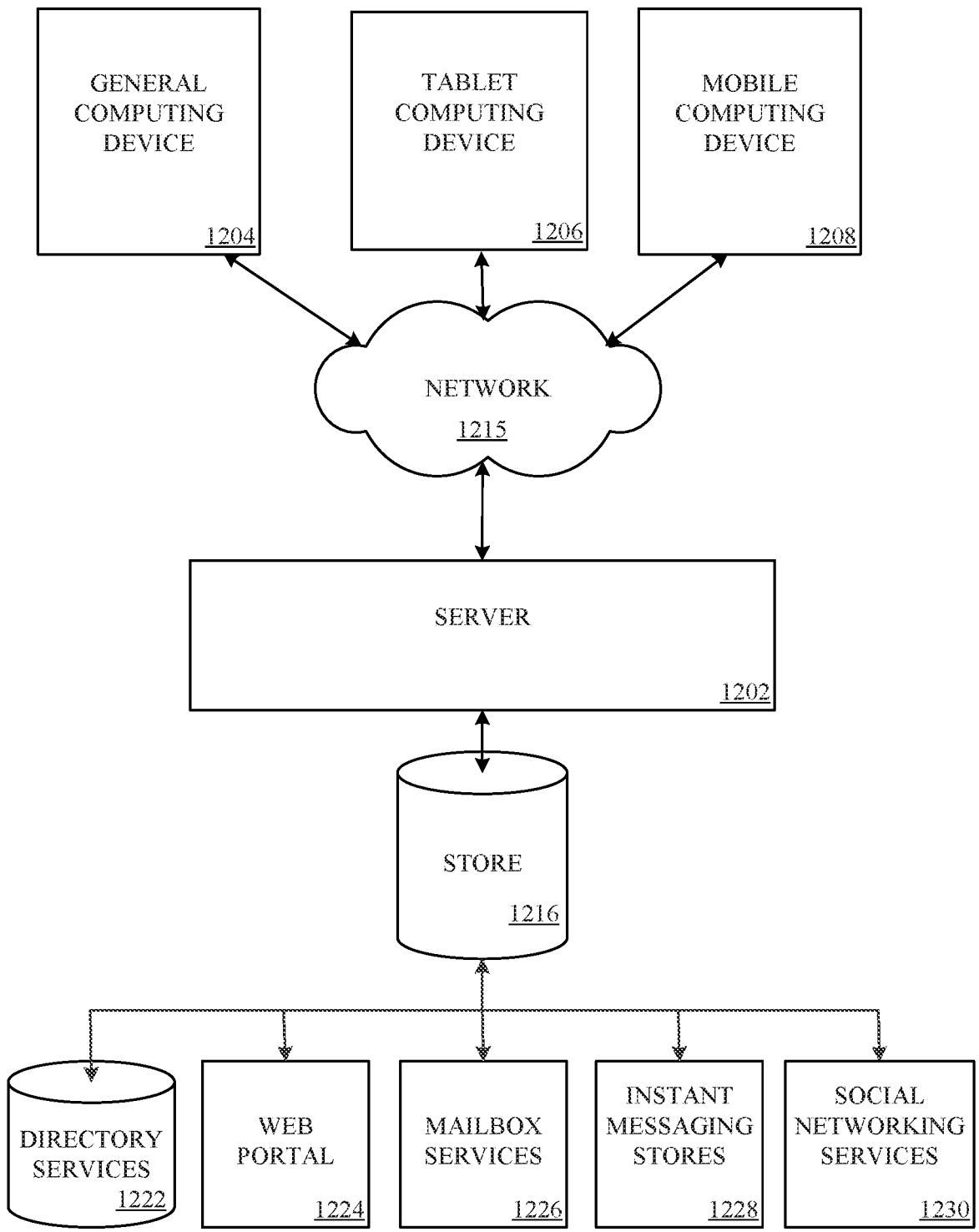
FIG. 12 is a simplified block diagram of a distributed computing system in which aspects of the present disclosure may be practiced.

FIG. 12 illustrates one aspect of the architecture of a system for processing data received at a computing system from a remote source, such as a personal/general computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. The program modules 1106 may be employed by a client that communicates with server device 1202, and/or the program modules 1106 may be employed by server device 1202. The server device 1202 may provide data to and from a client computing device such as a personal/general computer 1204, a tablet computing device 1206 and/or a mobile computing device 1208 (e.g., a smart phone) through a network 1215. By way of example, the computer systems described herein may be embodied in a personal/general computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for assisting with event execution, the method comprising:
    analyzing data from a calendar event in an electronic calendar application associated with a user, the analyzing comprising applying a natural language processing model trained to identify significant life events to the calendar event;
    identifying, based on the analysis, a significant life event associated with the user;
    identifying a plurality of sources that each have at least one recommendation for executing a type of event corresponding to the significant life event;
    generating an itinerary template for the significant life event from a plurality of the recommendations, the itinerary template including content from a first one of the plurality of sources and a second one of the plurality of sources; and
    surfacing the itinerary template, the itinerary template including a first link selectable for navigating a web browser to the first one of the plurality of sources, and a second link selectable for navigating the web browser to the second one of the plurality of sources.

2. The method of claim 1, wherein the itinerary template comprises a plurality of to-dos.

3. The method of claim 1, wherein the surfaced itinerary template is selectable for adding each of the plurality of to-dos to a to-do list application.

4. The method of claim 1, wherein the surfaced itinerary template is selectable for adding each of the plurality of to-dos to a calendar application.

5. The method of claim 1, wherein identifying the significant life event further comprises identifying a temporal component and a locational component for the significant life event.

6. The method of claim 5, wherein the generated itinerary has temporal constraints corresponding to the temporal component of the significant life event and locational constraints corresponding to the locational component for the significant life event.

7. The method of claim 1, wherein:
    the itinerary template is generated as one of a plurality of itinerary templates generated from the plurality of recommendations; and
    the itinerary template is surfaced as one of a plurality itinerary templates that are surfaced.

8. The method of claim 1, wherein each of the plurality of sources is selected from: resources posted online by users within a threshold proximity to the user in a digital social graph; electronic documents; and webpages.

9. The method of claim 1, wherein the significant life event is a vacation travel event.

10. The method of claim 9, wherein the at least one recommendation relates to one or more of: a hotel recommendation, a restaurant recommendation, and a point of interest recommendation.

11. The method of claim 1, wherein the significant life event is a party event.

12. The method of claim 11, wherein the at least one recommendation relates to one or more of: a theme for the party event; a location for the party event; food for the party event; and drinks for the party event.

13. The system of claim 11, wherein in identifying the trending application in the matched user group, the one or more processors are further responsive to the computer-executable instructions contained in the program code and operative to:
    identify a plurality of applications that are included in a most downloaded application percentage of applications in the application store by the matched user group.

14. The system of claim 11, wherein in identifying the trending application in the matched user group, the one or more processors are further responsive to the computer executable instructions contained in the program code and operative to:
    identify a plurality of applications that are included in a top number value of downloaded applications in the application store by the matched user group.

15. The system of claim 11, wherein the one or more processors are further responsive to the computer-executable instructions contained in the program ode and operative to:

identify a plurality of educational topics corresponding to the matched user group;

identify one or more top-rated applications related to the identified plurality of educational topics; and surface a recommendation on the computing device that the user download one or more of the identified top-rated applications.

16. A computer-readable storage device comprising executable instructions that, when executed by one or more processors, assist with event execution, the computer-readable storage device including instructions executable by the one or more processors for:

analyzing data from a calendar event in an electronic calendar application associated with a user, the analyzing comprising applying a natural language processing model trained to identify significant life events to the calendar event;

identifying, based on the analysis, a significant life event associated with the user;

identifying a plurality of sources that each have at least one recommendation for executing a type of event corresponding to the significant life event;

generating an itinerary template for the significant life event from a plurality of the recommendations, the itinerary template including content from a first one of the plurality of sources and a second one of the plurality of sources; and surfacing the itinerary template, the itinerary template including a first link selectable for navigating a web browser to the first one of the plurality of sources, and a second link selectable for navigating the web browser to the second one of the plurality of sources.

17. The computer-readable storage device of claim 16, wherein in identifying the significant life event, the instructions are further executable by the one or more processors for:

identifying a temporal component and a locational component for the significant life event.

18. The computer-readable storage device of claim 17, wherein the generated itinerary has temporal constraints corresponding to the temporal component of the significant life event and locational constraints corresponding to the locational component for the significant life event.

19. The computer-readable storage device of claim 16, wherein the itinerary template comprises a plurality of to-dos, and wherein the surfaced itinerary template is selectable for adding each of the plurality of to-dos to a to-do list application.

20. A system for assisting with application recommendations, comprising:

a memory for storing executable program code; and one or more processors, functionally coupled to the memory, the one or more processors being responsive to computer-executable instructions contained in the program code and operative to:

identify a plurality of characteristics associated with a user of a computing device, wherein the plurality of characteristics includes at least one of: an age of the user and a grade of educational enrollment of the user;

identify a plurality of user groups associated with an application store, wherein each of the plurality of user groups is associated with at least one of: an age range, and a grade of educational enrollment;

match the user to one of the plurality of user groups;

identify a trending application in the matched user group; and surface a recommendation on the computing device that the user download the trending application.

\* \* \* \* \*